United States Patent
Garrison

(10) Patent No.: US 9,685,026 B1
(45) Date of Patent: Jun. 20, 2017

(54) SMART BIN LOTTERY TICKET DISPENSER WITH VARYING TICKET SIZE INSERTS

(71) Applicant: Scientific Games International, Inc., Newark, DE (US)

(72) Inventor: Scott B. Garrison, Duluth, GA (US)

(73) Assignee: Scientific Games International, Inc., Newark, DE (US)

( * ) Notice: Subject to any disclaimer, the term of this patent is extended or adjusted under 35 U.S.C. 154(b) by 0 days.

(21) Appl. No.: 15/092,047

(22) Filed: Apr. 6, 2016

(51) Int. Cl.
G07F 11/00 (2006.01)
G07F 17/32 (2006.01)
G06Q 10/08 (2012.01)

(52) U.S. Cl.
CPC .......... *G07F 11/007* (2013.01); *G07F 17/329* (2013.01); *G06Q 10/087* (2013.01)

(58) Field of Classification Search
CPC ........ G07F 17/42; G07F 17/329; G07F 11/68; G07F 11/007
See application file for complete search history.

(56) References Cited

U.S. PATENT DOCUMENTS

| | | | |
|---|---|---|---|
| 5,386,934 A | 2/1995 | Lawrence | |
| 6,095,624 A * | 8/2000 | Wilbert | G07B 3/04 312/293.3 |
| 6,135,335 A | 10/2000 | Shoemaker, Jr. | |
| 7,014,065 B2 * | 3/2006 | Jensen | B65H 35/00 221/255 |
| 7,467,738 B2 * | 12/2008 | Woods | G07F 11/68 225/100 |
| 7,513,432 B2 | 4/2009 | Chang | |
| 7,665,394 B2 * | 2/2010 | Roberts | G07F 11/68 221/1 |
| 2001/0006181 A1 * | 7/2001 | Roberts | B26F 3/002 225/2 |
| 2001/0034263 A1 * | 10/2001 | Roberts | B26F 3/002 463/17 |
| 2005/0178810 A1 * | 8/2005 | Woods | G07F 11/68 225/1 |
| 2010/0308071 A1 | 12/2010 | Businger | |
| 2014/0046481 A1 * | 2/2014 | Siciliano | B65D 83/12 700/236 |
| 2014/0263373 A1 * | 9/2014 | Watson | B65D 21/0209 220/625 |

* cited by examiner

*Primary Examiner* — Gene Crawford
*Assistant Examiner* — Stephen Akridge
(74) *Attorney, Agent, or Firm* — Dority & Manning, P.A.

(57) ABSTRACT

A lottery ticket dispenser array includes a plurality of separate bins, with each bin defined by a housing having a defined first internal space for receipt of first stack of interconnected lottery tickets. A plurality of different sized bin inserts are also provided, with each bin insert insertable into the bin housings and defining a second internal space that is less than the first internal space of the housing for receipt of a second stack of lottery tickets having a lesser individual length than the first stack of lottery tickets. A controller within each bin housing recognizes placement and size of the bin insert within the housing. The controller is in communication with an electronic drive mechanism to modify operation thereof to accommodate the lesser individual length of the lottery tickets in the second stack of lottery tickets.

11 Claims, 4 Drawing Sheets

US 9,685,026 B1

SMART BIN LOTTERY TICKET DISPENSER WITH VARYING TICKET SIZE INSERTS

BACKGROUND

Instant lottery tickets are sold at many types of retail locations including, stores, such as grocery stores, general merchandise stores, and the like. Many such stores feature one or more check-out points or lanes equipped with a point-of-sale (POS) register. The lottery tickets, however, are typically sold at a separate lottery point-of-sale terminal within the same retail establishment. This system generally requires additional personnel to staff the lottery ticket POS terminal, or requires the store clerk to divide their time and responsibility between the lottery POS terminal and the store POS terminal. The conventional system and method also require a separate accountability and tracking system for lottery ticket sales, which can add significantly to the cost and burden of providing the lottery to players at the retail establishment.

In addition, because of the current methods by which the tickets are packaged and accounted for, an entire pack (also referred to as a "brick") of tickets is generally activated upon delivery to the retail establishment. This may result in a billing event to the retailer wherein payment becomes due on the entire pack before any significant number of the tickets have actually been sold, which can be a financial burden on the retailer.

Another problematic situation arises with certain current accountability systems and methods wherein the number of lottery tickets sold during a work shift or other defined time period must be accounted for and reconciled with payments received at the POS register or lottery terminal. Often, this is done by hand by store clerks who record start and end serial numbers of the tickets sold during their shift, which can be prone to human error, particularly in a busy or hectic environment. Systems have been proposed that automatically record the serial numbers and calculate the number of tickets sold, but even these systems do not conduct a balance reconciliation with the POS register.

In addition, instant scratch-off lottery tickets are typically dispensed from an array having a number of different ticket bins, wherein such bins are typically configured to dispense tickets of a given size generally from the same ticket manufacturer. A solution to the issues discussed above should also take into account the drawbacks of conventional dispenser arrays as well. For example, such a solution would be more beneficial if it contemplated a multiple bin array wherein the bins can be configured with the functionality to dispense lottery tickets having distinctly different sizes. Thus, a different array would not be needed for tickets supplied from a different manufacturer or otherwise having different dimensions.

The present invention relates to a unique system and method that addresses at least certain of the issues identified above, and may provide additional benefits over the conventional methodology and systems.

SUMMARY

Objects and advantages of the invention will be set forth in part in the following description, or may be obvious from the description, or may be learned through practice of the invention.

In accordance with aspects of the invention, a lottery ticket dispensing array is provided for dispensing instant or other preprinted lottery tickets at a retail establishment. The type of retail establishment may vary widely within the scope and spirit of the invention. For example, in certain embodiments, the retail establishments may be convenience stores, gas stations, pubs, and any other establishment that typically sells lottery tickets to the public. The present array has particular usefulness for much larger retail establishments, such as "big-box" retail stores that are part of a national or other geographic chain, wherein the sale of lottery ticket sales has generally not been implemented.

The lottery ticket dispenser array includes a plurality of separate bins, wherein each bin is defined by a housing having a defined first internal space for receipt of a first stack of interconnected lottery tickets therein. For example, the dispenser array may include ten separate bins, with each bin containing a supply of different scratch-off lottery ticket games, or two or more bins may contain a respective supply of tickets for the same game. Regardless, each lottery ticket contained in the bins includes a machine readable code printed thereon, such as a bar code, QR code, or the like.

Each bin in the array includes an electronic drive mechanism that, when activated, dispenses one or more lottery tickets from the bin (depending on the number of tickets requested by the patron). Each bin also includes a scanner disposed to read the code on lottery tickets dispensed from the bin position. In operation of the system, a purchase signal for dispensing a particular lottery ticket is routed to the respective bin containing the lottery ticket, which activates the drive mechanism to dispense the requisite number of tickets. As the tickets are dispensed from the bin, the scanner may read the code printed on each ticket, which eventually results in a signal being routed to a central lottery server for each lottery ticket dispensed from the dispenser array. The code printed on each ticket contains identifying information unique to the ticket, and the signal transmitted to the central server enables actions relevant to the sale of the tickets, such as activating the ticket in the lottery provider's system, accounting for tickets sold at a particular retail establishment, reconciling tickets sold at a retail establishment with tickets delivered to the establishment, and for forth. For sequentially dispensed tickets, for example five tickets in a single purchase transaction, the system may be configured to read or otherwise recognize the codes on the first and last ticket if the codes are printed in sequential order on the tickets. By knowing the first and last codes, the intervening codes are readily determined.

To significantly increase the versatility of the dispenser array, a plurality of different sized bin inserts are provided. Each of these bin inserts is insertable into a respective one of the bin housings and defines a second internal space that is less than the first internal space of the housing for receipt of a second stack of lottery tickets having a lesser individual length than the first stack of lottery tickets. The second stack of tickets may also have a reduced width as compared to the first stack, with the second internal space of the inserts sized accordingly. Not all lottery tickets have the same dimensions, particularly interconnected scratch-off lottery tickets from different ticket manufacturers. The plurality of bin inserts allow for configuration of one or more of the bins within the array for receipt and dispensing of different sized tickets.

A respective controller within each bin housing recognizes placement of a bin insert within the housing. The controller is in communication with the electronic drive mechanism to modify operation thereof to accommodate the lesser individual length of the lottery tickets in the second stack of lottery tickets. For example, the controller may change the run time of the drive mechanism to accommodate for the decreased length of the new stack of tickets within the insert.

To accommodate the second stack of tickets, the second internal space of the inserts may be defined by a reduced height as compared to the first internal space of the bin housing. For certain tickets, the second internal space of the inserts may also be defined by a reduced width as compared to the first internal space of the bin housing.

In certain embodiments, it may be desired to include a releasable latch mechanism configured between the insert and bin housing. Any manner of mechanical latch may suffice for this purpose. In desirable embodiment, the latch mechanism is magnetic latch that ensures a proper position and orientation of the insert within the bin housing.

A signal interface can be configured between the insert and bin housing that identifies the presence and particular size of the insert to the controller. This interface may be, for example, a multi-position contact switch, such as a dip switch or reed switch, wherein one of the positions in the switch is engaged or otherwise activated upon insertion of the insert into the housing. The switch is in communication with controller, which includes an operating profile for each switch position. These profiles correspond to the different sized inserts such that the controller modifies operation of the bin, particularly the drive mechanism, as a function of the particular insert size.

So as to readily accommodate the bin inserts into the internal space of the bin housings, in certain embodiments, each bin housing includes a front panel that opens to the internal space, wherein the controller, drive mechanism, and scanner are mounted to a back side of the front panel. It should be understood that the plurality of bin inserts can include any combination of the same or different sized inserts provided to a retailer along with the array. For example, a set of different sized inserts may be provided for each bin in the array.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Figure 1:
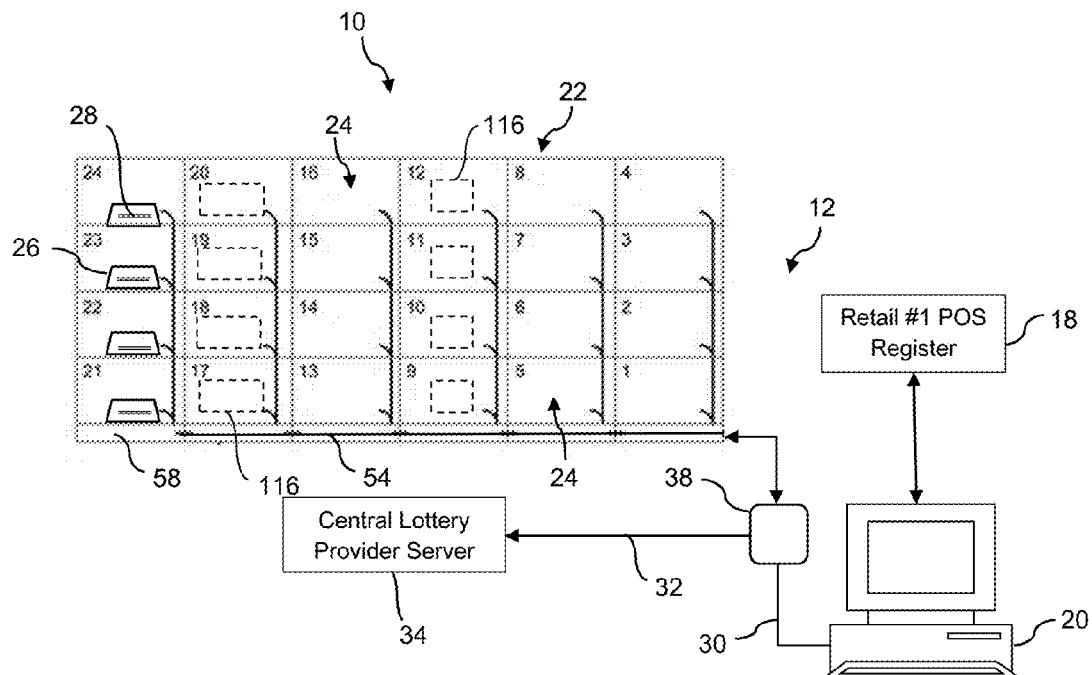
FIG. 1 is a block diagram of a lottery ticket dispenser in accordance with aspects of the present invention.

FIG. 1 depicts an embodiment of a system 10 and related methodology for dispensing lottery tickets 14 at a retail establishment 12. As mentioned above, the type of retail establishment 12 may vary widely within the scope and spirit of the invention. A retail establishment or location 12, such as a retail store, convenience store, pub, restaurant, or the like, is generally authorized by a lottery jurisdiction to carry out lottery activities, such as the sale of instant scratch-off tickets or terminal printed draw tickets for games such as Powerball™. The lottery jurisdiction may be a state lottery authority, such as the Pennsylvania Lottery, or any other governmental jurisdictional authority. A separate game provider may be partnered with the lottery jurisdiction to provide certain control, implementation, and logistical functions of the game. It should be appreciated that the type of retail establishment 12 or lottery jurisdiction entities are not limiting factors of the invention. Although not limited to such, the present system 10 has particular usefulness for larger retail establishments, such as "big-box" retail stores that are part of a national or other geographic chain.

The retail establishment 12 includes one or more retail point-of-sale (POS) registers 18 wherein patrons of the establishment 12 purchase goods. Typically, a scanner is associated with the POS register 18 to scan a UPC code on the products, with the UPC code linked to a purchase price and identification of the products, as is well-known in the art.

Figure 3:
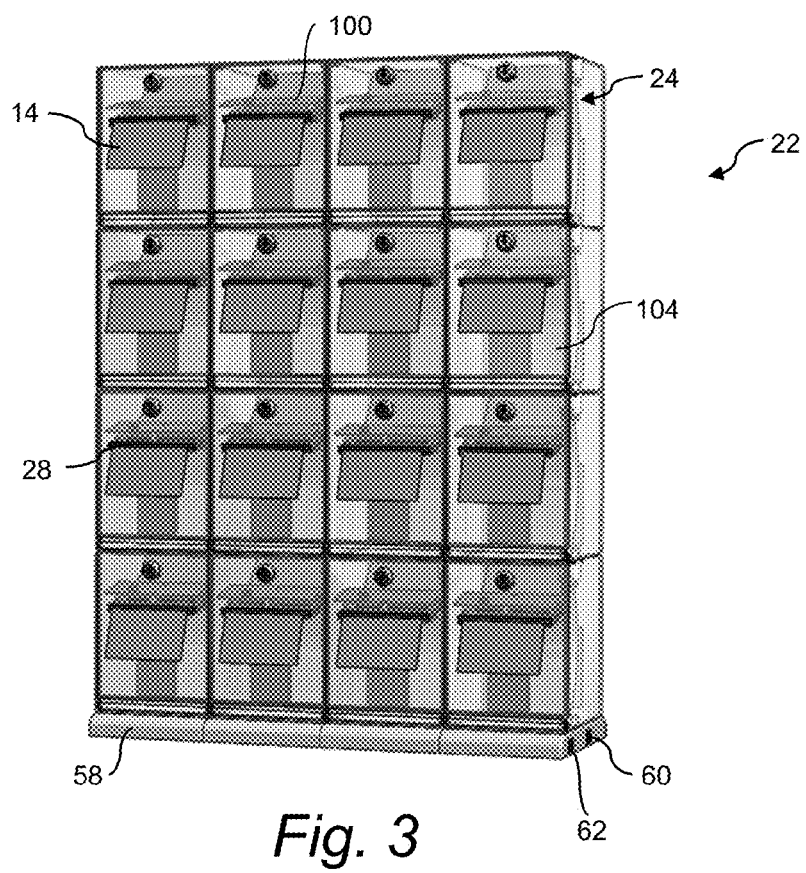
FIG. 3 is a back perspective view of an embodiment of a lottery ticket dispenser.

In the embodiment of FIG. 1, a lottery ticket terminal 20 is configured in wired or wireless communication with the retail POS register 18 to accept a request for purchase of a particular lottery ticket 14 (FIG. 3) selected from a plurality of different lottery tickets made available to patrons for purchase. This request may be input directly to the terminal 20 or come via the POS register 18. The lottery tickets 14 may be, for example, conventional instant scratch-off lottery tickets. Various types of lottery ticket terminals are known in the art and suitable for configuration with a system 10 in accordance with the invention. For example, Scientific Games Corporation having a principal place of business in Alpharetta, Ga., USA, offers Flair™ and Wave™ lottery ticket terminals that may be readily configured by those skilled in the art for a system as described herein.

A patron's request for a particular scratch-off lottery ticket may be inputted into the lottery ticket terminal 20 by a retail clerk or other employee of the retail establishment 12 by various means. For example, the terminal 20 may be configured with a scanner, wherein the clerk scans a "master" having a code corresponding to the particular lottery ticket 14 requested by the patron. Thus, a master would be provided for each type of lottery ticket 14 offered by the establishment 12. In another embodiment, the terminal 20 may be configured with a touch-screen, keyboard, or other data input device, wherein the clerk enters or identifies the ticket 14 requested by the patron.

Still referring to the embodiment of FIG. 1, a "smart" lottery ticket dispenser array 22 is in wired or wireless communication with the terminal 20. This dispenser array includes one or a plurality of individual lottery ticket bins 24, with each bin 24 typically containing a different respective lottery ticket game. For example, one bin 24 may contain "Lucky 7" themed scratch-off lottery tickets 14, while an adjacent bin 24 may contain "Gold Rush" themed scratch-off lottery tickets 14, and so forth.

Each lottery ticket 14 in the different bins includes a machine readable code printed thereon, such as a bar code, QR code, or the like. The type of code may vary depending on the desired information content of the code, space on the ticket 14, and so forth. The use of such codes on lottery tickets 14 for various functions related to inventory, identification, verification, and security are well-known.

Referring to figures in general, each bin 24 in the dispenser array 22 includes an electronic drive mechanism 26 that, when activated, dispenses one or more lottery tickets 14 from the bin 24 (depending on the number of tickets requested by the patron). This drive mechanism 26 may include a motor that drives a friction roll, wherein the tickets 14 are engaged between the friction roll and an idler roll such that driven rotation of the friction roll causes the tickets 14 to be advanced through a dispensing slot 28 in a wall of the individual bin 24. The drive mechanism 26 may also include a sensor 106 that detects a leading and/or trailing edge of adjacent tickets so as to control the length or the time of the dispense sequence. For example, such a sensor may be an optical sensor that detects a perforation line between adjacent tickets. Alternately, the friction or idler roll may include an encoder that indirectly measures the length of a ticket passing between the rolls as a function or rotations of the roll. In another embodiment, a timing circuit may control the dispense cycle as a function of run time of the motor. It should be appreciated that the drive mechanism may be variously configured to perform the functions of dispensing the requisite number of tickets 14 from the individual respective bin 24 within the scope and spirit of the invention.

In the illustrated embodiments, each bin 24 also includes a scanner 40 disposed so as to read the code on the lottery tickets 14 as they are dispensed from the bin 24. The scanner 40 may be any conventional barcode reader, such as a point scanner, linear scanner, laser scanner, LED image scanner, and so forth. The tickets 14 are loaded into the bins 24 such that the code printed on each ticket passes within the detection field of the scanner 40. An integral (or separate) reader is configured with the scanner 40 to decode the scanner signal.

Each bin 24 includes a control board 100 on which certain of the electronic control components are mounted, such as the leading edge sensor 106, a controller 102 (discussed in greater detail below), a drive motor timing circuit, and so forth. Any manner of control or power components can be mounted on the board 100 for operation of the individual bins 24 and overall array 22 as described herein.

In operation of the system 10 depicted in FIG. 1, the lottery ticket terminal 20 transmits a purchase signal 30 for dispensing a particular lottery ticket 14 that is routed to the respective bin 24 within the dispenser array 22 containing the requested lottery ticket. This purchase signal 30 may be sent to a bin controller 38 associated with the dispenser array 22, with the controller 38 generating a dispense signal that is routed to the proper bin 24 to activate the drive mechanism 26 and dispense the requisite number of lottery tickets 14 from the bin 24. In essence, the bin controller 38 functions as a signal router for the array 22 that ensures that the signal 33 is routed to the correct bin 24.

In an alternate embodiment, the purchase signal 30 is generated by the POS register 18 and transmitted to the bin controller 38 after the POS register 18 receives a purchase code from the lottery ticket terminal 20 corresponding to the particular ticket requested by the patron.

As the tickets 14 are dispensed from the bin 24, the scanner 40 reads the code printed on each ticket or, alternatively, the first and last codes printed on sequentially dispensed tickets. A signal 32 corresponding to the scanned code is generated and routed to a central lottery server 34 for each lottery ticket dispensed from the dispenser array 22. As mentioned, the code printed on each ticket contains identifying information unique to the ticket, much akin to a serial number assigned to each ticket, and the signal 32 transmitted to the central server 34 enables actions relevant to the sale/dispensing of the individual tickets 14. For example, the central lottery server 34 may include a database of all tickets delivered to the respective retail establishments 12, and the near instantaneous identification of dispensed/sold lottery tickets 14 to the server 34 enables various desired functionalities. For example, the individual lottery tickets 14 may remain "inactive" in the lottery provider's system (and thus unable to be redeemed) until individually activated by the central lottery server 34 as they are dispensed and sold. Thus, fraudulently obtained tickets (e.g., stolen or otherwise illegally obtained) cannot be redeemed. This is contrary to a conventional practice of activating entire books ("packs") of tickets upon delivery to a retail establishment 12.

The present system 10 and associated method allows for enhanced accountability of lottery tickets 14 sold at a particular retail establishment 12 by logging each ticket as it is sold and dispensed. The number of tickets 14 sold during a work shift (or other time period) is easily determined by generating a report by the central server 34 of the tickets sold at any of the retail establishments during any defined time period. The number of tickets 14 sold at any of the retail establishments 12 can be readily reconciled with tickets delivered to the establishment. Likewise, the number of tickets 14 dispensed during a defined time can be readily and electronically reconciled with reported purchase transactions from the respective establishment 12, with discrepancies being immediately identified for further investigation.

Another particular advantage of the system 10 and associated method is that billing practices between the retail establishments 12 and lottery authority, the lottery service provider or ticket manufacturer can be based on real-time sales of the lottery tickets 14. For example, the retail establishments 12 can be invoiced on a periodic basis (e.g., daily or weekly) for the actual number of tickets sold (dispensed) at each respective establishment based on the signals 32 routed to the central lottery server 34 instead of upon delivery, or other payment methodology typically in use today. These include but are not limited to consignment for a predetermined time period, or estimate of sales based on the number of winning tickets cashed from a pack of tickets being sold.

The central lottery server 34 may be common to a number of different retail establishments 12. The term "server" is used herein to encompass any configuration of computer hardware and software that is maintained by a lottery authority or game provider to carry out the functionalities of the present system 10 and associated method, as well as any manner of additional lottery functions known to those skilled in the art. It should be readily appreciated that the server 34 may include an integrated server, or any manner of periphery server or other hardware structure. The central lottery server 34 is typically remote from the retail establishments 12, and is in communication with the establishments 12 via a suitable secure communication network, which may include any manner of wide area network, wireless internet, or cloud computing. The server 34 may be a single networked computer, or a series of interconnected computers having access to the communications network via a gateway or other known networking system. Generally, the server 34 is configured to communicate with, manage, execute and control individual lottery terminal units 20 within the lottery jurisdiction. The server 34 may be a "front end" server provided by the lottery game provider that is interfaced with the existing draw/instant game system infrastructure one or more separate lottery authorities. The server 34 may include a memory for storing gaming procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 10.

The server 34 may be directly or indirectly connected through an I/O bus to any manner of peripheral devices such as storage devices, wireless adaptors, printers, and the like. In addition, a database (DB) may be communicatively connected to the server 34 and provide a data repository for the storage and correlation of information gathered from the individual dispenser arrays 22, such as the identity of each lottery ticket 14 dispensed from the array, the time of the dispense sequence, confirmation of ticket activation, and so forth.

It should be appreciated that embodiments of the methods and systems 10 disclosed herein may be executed by one or more suitable networked lottery gaming components and establishment components (e.g., POS register 18, back office server, and so forth) within a plurality of the establishments 12, as well as the remote central server 34. Such gaming systems and computing devices may access one or more computer-readable media that embody computer-readable instructions which, when executed by at least one computer, cause the computer(s) to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology may be implemented using one or more computer-readable media.

As mentioned above, aspects of the present system 10 and methods rely on the transmission of data over one or more communications networks. It should be appreciated that network communications can comprise sending and/or receiving information over one or more networks of various forms. For example, a network can comprise a dial-in, public switched telephone network (PSTN), a local area network (LAN), wide area network (WAN), the Internet, an intranet or other type of network. A network may comprise any number and/or combination of hard-wired, wireless, or other communication links.

Figure 2:
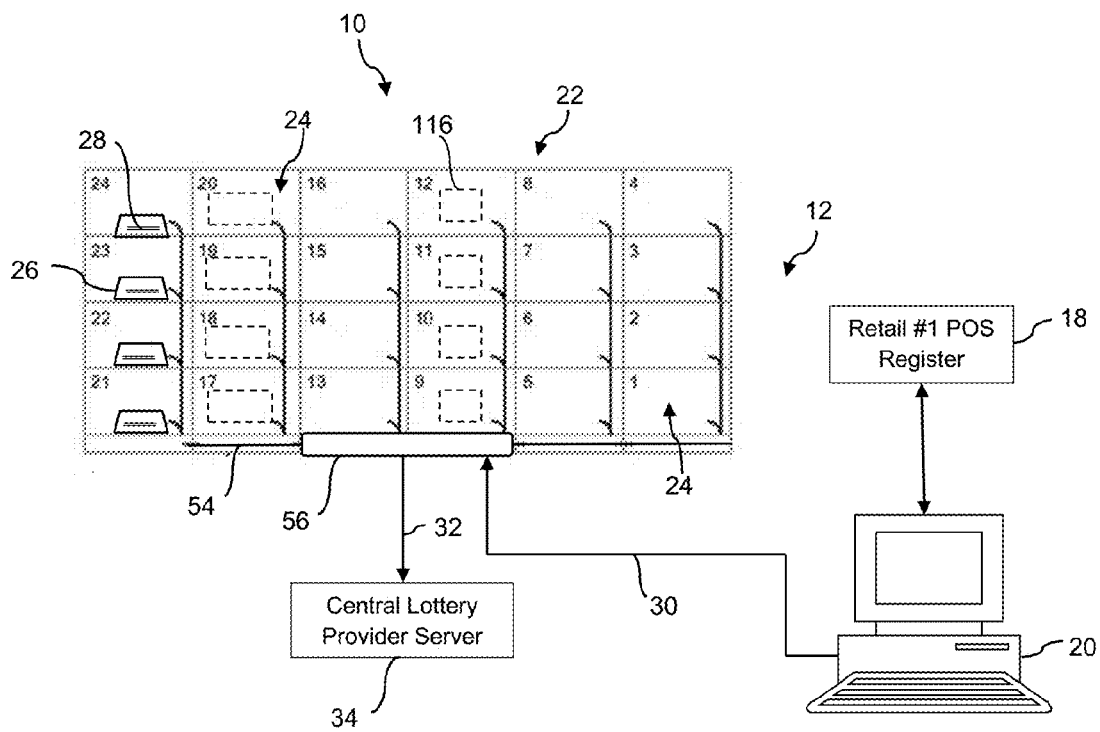
FIG. 2 is a block diagram of another embodiment of a lottery ticket dispenser in accordance with aspects of the present invention.

FIG. 2 depicts an embodiment that is similar to FIG. 2 with the exception that the dispenser array 22 (and thus the individual bins 24) are in direct communication with the central lottery server 34 via a signal router 56 integrated with the dispenser array 22. This router 56 routes the purchase signal 30 from the lottery ticket terminal 20 to the correct bin 24, and routes the bin signal 32 directly to the server 34 via a suitable wired or wireless communication network.

In the depicted embodiments, the dispenser array 22 includes a bottom row of bins 24 having interconnected base structures 58. For example, each base structure 58 may include a male power plug and male data plug along one side, and a female power port 60 and female data port 62 along the opposite side. The plugs and ports of adjacent base structures 58 interconnect to essentially define a data bus 54 (FIGS. 1 and 2) running the length of the base structures 58. An exposed power port 60 and data port 62 at one of the ends of the interconnected base structures is available for connection with a power cord and a data cord from the controller 38 or lottery terminal 20.

Figure 4:
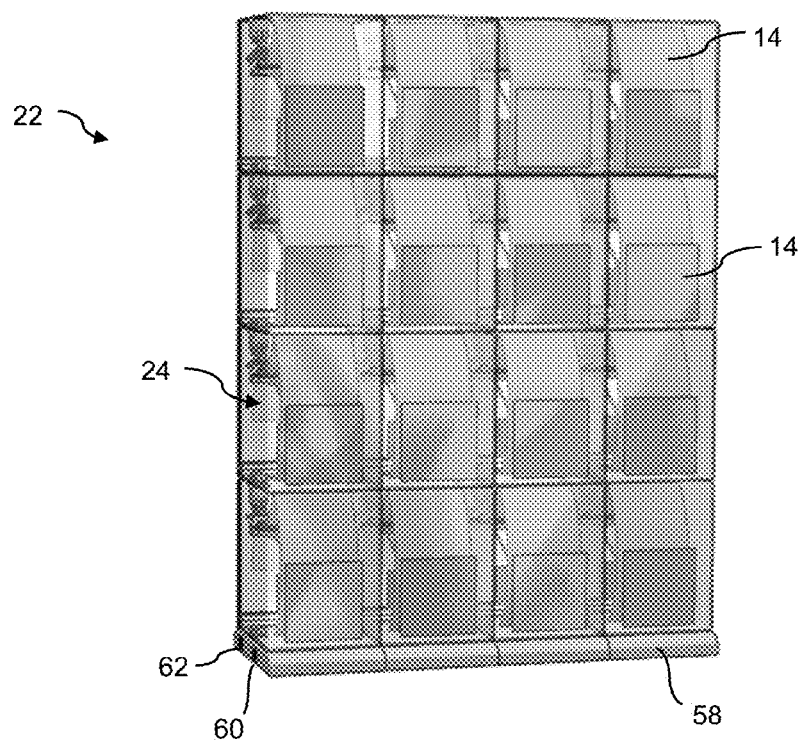
FIG. 4 is a front perspective view of the lottery ticket dispenser of FIG. 3.

Referring to FIGS. 3 through 6, each of the individual bins 24 includes a multi-sided housing 108 in which a first stack or pack of lottery tickets 114 is stored. In the depicted embodiments, the housing 108 is a box-like member having top and bottom walls, side walls, and a pivotal front panel 104. The front panel 104 swings open to provide access into the housing 108 for loading the ticket stack 114. As shown in FIG. 4, each bin 24 may include a sample ticket 14 or other identifying insert attached to a front face of the bin 24 that faces the patrons so that the patron is aware of the exact tickets available for purchase. The tickets 14 may be connected at a perforation line, or separated. A drive mechanism 26 and scanner 40 are configured within each bin 24, as discussed above, wherein upon receipt of a purchase signal, the drive mechanism dispenses the requisite number of tickets 14 out of the slot 28 in the back face of the bin 24 as the scanner 40 reads the code printed on the ticket as it passes through the slot 28. Each bin 24 includes a male power/data connector 64 on the top or bottom surface, and a corresponding female power/data connector 66 on the opposite surface. With this configuration, a plurality of the bins 24 can be vertically stacked and interconnected, as depicted in the various figures.

Figures 5, 6, 7:
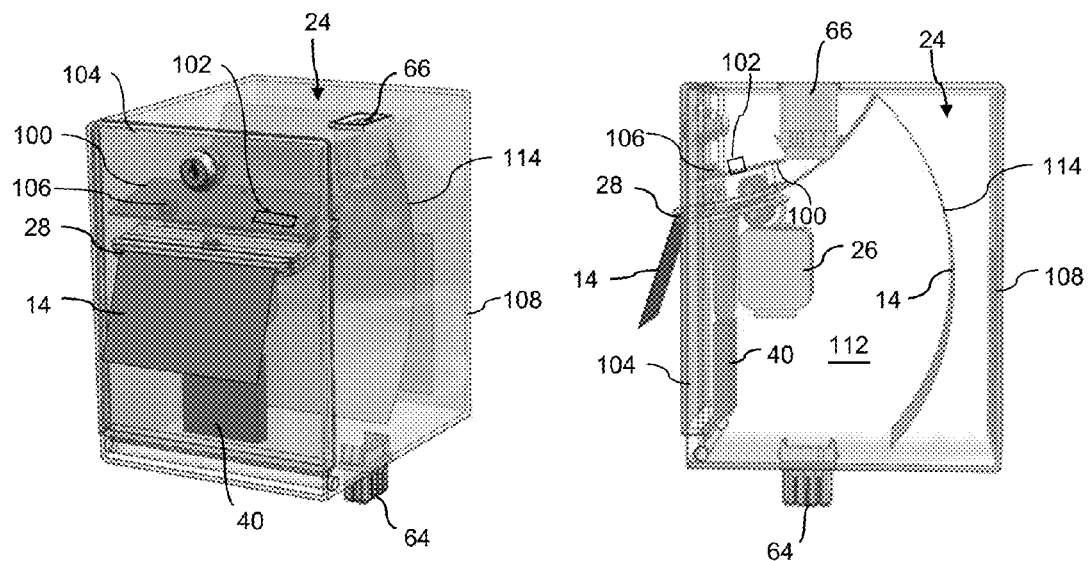
FIG. 5 is a back perspective view of an individual bin of the lottery ticket dispenser of FIG. 4.
FIG. 6 is a side view of the individual bin of the lottery ticket dispenser of FIG. 5.
FIG. 7 is a side diagram view of an embodiment of an individual lottery ticket bin with an installed insert.

FIGS. 5 and 6 depict the bin housing 108 in a first configuration defined by a top wall, bottom wall, and side walls, as well as the front panel 104. The walls define a first internal space 112 having a size to accommodate a first fan-folded stack 114 of perforated tickets 14 having a relatively large individual size (from a length and/or width aspect). Referring to FIG. 7, to significantly increase the versatility of the dispenser array 10, particularly the individual bins 24, a plurality of different sized bin inserts 116 are provided. Each bin insert 116 is insertable into a respective bin housing 118 and defines a second internal space 122 that is less than the first internal space 112 of the housing 118. For example, the second internal space 122 has a height 126 that is less than the corresponding aspects of the first internal space 112. The second internal space 122 is sized for receipt of a second stack 124 of lottery tickets 14 having a lesser individual length than the first stack 114 of lottery tickets 14. The second stack 124 of tickets may also have a reduced width as compared to the first stack 114, with the second internal space 122 of the insert 116 having a correspondingly reduced width 128.

A plurality of the inserts 116 having different internal spaces 122 provides the individual bin 24 with the capability to dispense different sized tickets. As mentioned above, not all lottery tickets have the same dimensions, particularly interconnected scratch-off lottery tickets from different ticket manufacturers. The plurality of bin inserts 116 allow for configuration of the bins 24 for receipt and dispensing of different sized tickets 14.

Figure 8:
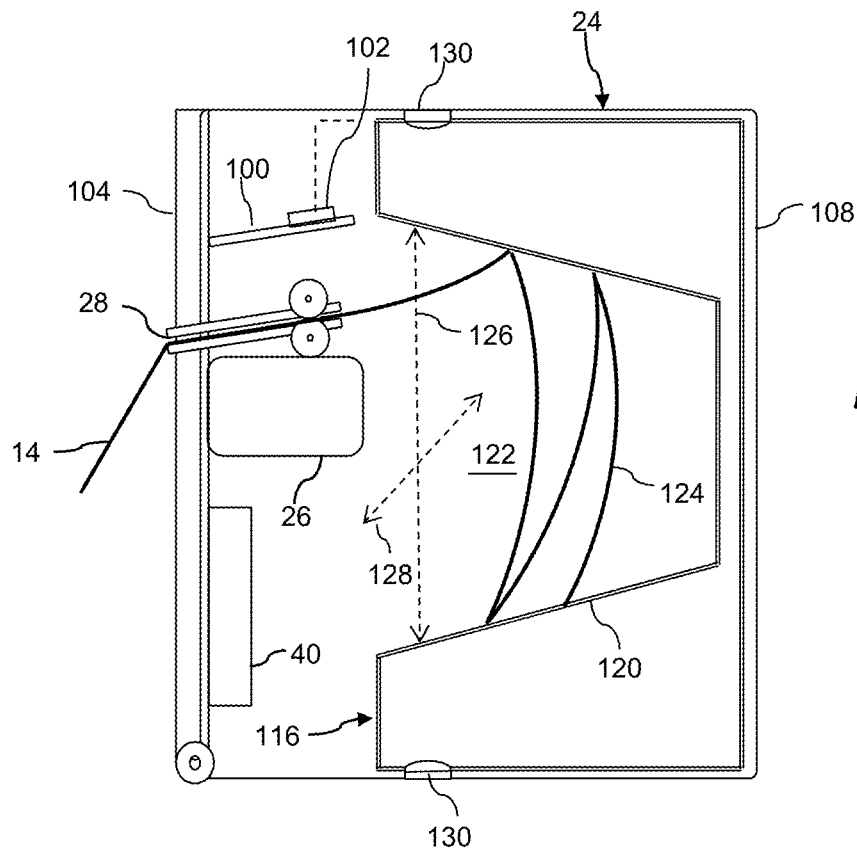
FIG. 8 is a side diagram view of an embodiment of an individual lottery ticket dispenser with an alternate sized insert.

For illustrative purposes, FIG. 7 illustrates the bin insert 116 having a second internal space 122 defined by a height 126 and a width 128 for receipt and dispensing of the second stack 124 of tickets 14 that have a significantly reduced length as compared to the individual tickets 14 depicted in the bin 24 of FIGS. 5 and 6. FIG. 8 illustrates an insert 116 with an internal space 122 defined by the height 126 and width 128 aspects that is larger than the internal space 122 of FIG. 7, but still smaller than the first internal space 112 of FIG. 6. Thus, the bin insert 116 of FIG. 8 is configured for dispensing the second stack 124 of tickets 14 having a length between that of the tickets 14 in FIG. 6 and in FIG. 7. It should be appreciated that terms "length" and "width" are used without reference to orientation of the lottery ticket graphics on the tickets. In other words, the tickets 14 could be oriented sideways in the respective stack such that the tickets are interconnected along a side of the ticket, and not along the top or bottom edge of the ticket 14.

Referring to FIGS. 5 through 8 in general, a controller 102 is provided within each bin housing 108, for example mounted to or an integral component of the control board 100. This controller 102 recognizes when a bin insert 116 has been inserted into the bin housing 108, as well as the size of the bin insert 108, as discussed in greater detail below. The controller 102 is in communication with the drive mechanism 26 and either includes or is in communication with a library of stored bin insert profiles that modify or change operation of the electronic drive mechanism 26 as a function of the particular insert 116 placed in the bin housing 108 to accommodate the lesser individual length of the lottery tickets 14 in the second stack 124 of tickets. For example, the controller 102 may change the run time of the drive mechanism 26 to accommodate for the decreased length of the new stack 124 of tickets within the insert 116.

Figure 9:
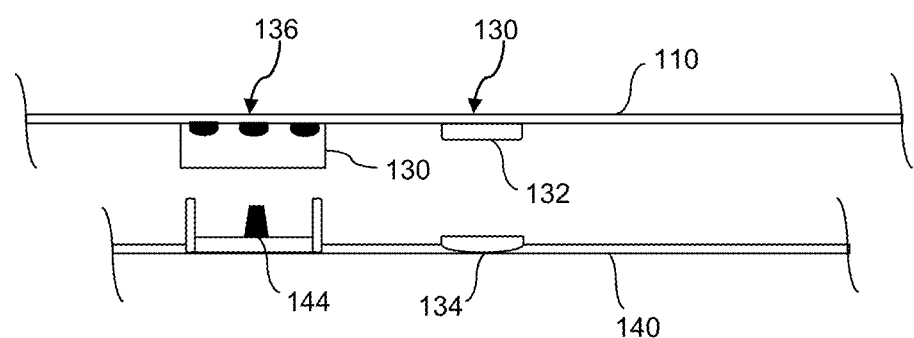
FIG. 9 is a diagram view of a switch and latch mechanism configured between the bin housing and insert.

Referring to FIGS. 7 through 9, it a releasable latch mechanism 130 can be configured between the bin insert 116 and bin housing 108. Any manner of releasable, mechanical latch 130 may suffice for this purpose. In a particular embodiment illustrated in the figures, the latch mechanism 130 is magnetic latch that ensures a proper position and orientation of the insert 116 within the bin housing 108 immediately upon insertion of the insert 116 into the housing 108. Referring to FIG. 9, the magnetic latch 130 may include a first magnet 132 disposed on an upper wall 110 of the bin housing 108 at a location so as to latch with a second magnet 134 disposed on an upper edge 140 of the bin insert 116. The same first and second magnets 132, 134 may be provide at the bottom wall and bottom edge of the insert 116 and housing 108, respectively.

It should be readily appreciated that the bin inserts 116 can be configured in various ways. For example, in the embodiment of FIG. 7, the bin insert 116 is defined by a panel member 118 having a top edge 140 and a bottom edge 142 that connect with the housing 108 via the latch mechanism 130. In an alternate embodiment depicted in FIG. 8, the bin insert 116 is defined by a closed, box-like member 120 with sides, top, and bottom walls that slides into the housing 108. A latch 130 can be configured between any of the insert walls 116 and the housing 108.

Referring to FIG. 9, a signal interface 136 can be configured between the bin insert 116 and bin housing 108 that identifies the presence and particular size of the insert 116 to the controller. This interface may be, for example, a multi-position electrical or mechanical contact switch 138, such as a dip switch or reed switch, wherein one of the positions in the switch is engaged or otherwise activated by a contact or mechanical element 144 on insert 116 upon insertion of the insert 116 into the bin housing 108. The switch is in communication with controller 102, which includes an operating profile for each switch position. As discussed, these profiles correspond to the different sized bin inserts 116 such that the controller 102 modifies operation of the bin 24, particularly the drive mechanism 26, as a function of the particular insert size.

As mentioned, each bin housing 108 includes a front panel 104 that opens to the internal space 112, 122. So as to readily accommodate the bin inserts 116 into the first internal space 112 of the bin housing 108, the controller 102, control board 100, drive mechanism 26, and scanner 40 can be mounted to a back side of the front panel 104.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A lottery ticket dispenser array, comprising:
   a plurality of separate bins, each bin defined by a housing having a defined first internal space for receipt of first stack of interconnected lottery tickets;
   each bin having an electronic drive mechanism that dispenses the lottery tickets therefrom;
   each bin comprising a scanner disposed to read a code on the lottery tickets dispensed from the bin;
   a plurality of different sized bin inserts, each bin insert insertable into the bin housings and defining a second internal space that is less than the first internal space of the housing for receipt of a second stack of lottery tickets having a lesser individual length than the first stack of lottery tickets;
   a controller within each bin housing that recognizes placement of the bin insert within the housing, the controller in communication with the electronic drive mechanism to modify operation thereof to accommodate the lesser individual length of the lottery tickets in the second stack of lottery tickets; and
   a signal interface between the bin inserts and bin housing that identifies size of the inserts to the controller.

2. The lottery ticket dispenser as in claim 1, wherein the second internal space of the bin inserts is defined by a reduced height as compared to the first internal space of the bin housing.

3. The lottery ticket dispenser as in claim 2, wherein the second internal space of the bin inserts is also defined by a reduced width as compared to the first internal space of the bin housing.

4. The lottery ticket dispenser as in claim 1, further comprising a latch mechanism configured between the inserts and bin housing.

5. The lottery ticket dispenser as in claim 4, wherein the latch mechanism is a magnetic latch.

6. The lottery ticket dispenser as in claim 1, wherein the signal interface is a multi-position switch, each position of the switch corresponding to a different sized bin insert, wherein the bin inserts engage one of the switch positions upon insertion into the bin housing.

7. The lottery ticket dispenser as in claim 1, wherein run time of the electronic drive mechanism is changed by the controller to accommodate the lesser length of the lottery tickets in the inserts.

8. The lottery ticket dispenser as in claim 1, wherein each bin housing comprises a front panel that opens to the first internal space of the bin housing, the controller, drive mechanism, and scanner mounted to a back side of the front panel.

9. The lottery ticket dispenser as in claim 1, wherein the plurality of bin inserts include a set of the bin inserts having a different second internal space.

10. The lottery ticket dispenser as in claim 9, comprising a plurality of the sets of bin inserts.

11. A lottery ticket dispenser array, comprising:
  a plurality of separate bins, each bin defined by a housing having a defined first internal space for receipt of first stack of interconnected lottery tickets;
    each bin having an electronic drive mechanism that dispenses the lottery tickets therefrom;
    each bin comprising a scanner disposed to read a code on the lottery tickets dispensed from the bin;
    a plurality of different sized bin inserts, each bin insert insertable into the bin housings and defining a second internal space that is less than the first internal space of the housing for receipt of a second stack of lottery tickets having a lesser individual length than the first stack of lottery tickets, wherein the second internal space has a height dimension defined completely within the bin insert such that the second stack of lottery tickets engage the bin insert along top and bottom edges of the lottery tickets;
  a controller within each bin housing that recognizes placement of the bin insert within the housing, the controller in communication with the electronic drive mechanism to modify operation thereof to accommodate the lesser individual length of the lottery tickets in the second stack of lottery tickets.

* * * * *